(12) United States Patent
Harruna

(10) Patent No.: US 8,418,659 B2
(45) Date of Patent: Apr. 16, 2013

(54) LEASH OR HARNESS WITH A BUILT-IN CONTAINER FOR SANITIZER AND OTHER FLUIDS, AND WIPE COMPARTMENT AND METHODS OF USES THEREOF

(76) Inventor: Issifu Ibrahim Harruna, Conyers, GA (US)

( * ) Notice: Subject to any disclaimer, the term of this patent is extended or adjusted under 35 U.S.C. 154(b) by 0 days.

(21) Appl. No.: 12/928,400

(22) Filed: Dec. 10, 2010

(65) Prior Publication Data
US 2011/0139090 A1 Jun. 16, 2011

Related U.S. Application Data

(60) Provisional application No. 61/285,680, filed on Dec. 11, 2009.

(51) Int. Cl.
*B65H 75/34* (2006.01)
(52) U.S. Cl.
USPC ............................................................ 119/796
(58) Field of Classification Search .................. 119/796, 119/769, 774, 775, 795, 797
See application file for complete search history.

(56) References Cited

U.S. PATENT DOCUMENTS

| | | |
|---|---|---|
| 4,210,351 A | 7/1980 | Orofino |
| 5,129,363 A | 7/1992 | Ricketts |
| 5,129,614 A | 7/1992 | Kohl |
| 5,363,809 A | 11/1994 | Roe |
| 5,429,075 A | 7/1995 | Passarella et al. |
| 5,441,017 A | 8/1995 | Lindsay |
| 5,447,227 A | 9/1995 | Koseberg |
| 5,517,949 A | 5/1996 | Harris et al. |
| 5,624,144 A | 4/1997 | Roche |
| 5,724,921 A | 3/1998 | Bell |
| 5,732,662 A | 3/1998 | Jacobsen |
| 5,826,547 A | 10/1998 | Gajewska |
| 6,003,472 A | 12/1999 | Matt et al. |
| 6,024,054 A | 2/2000 | Matt et al. |
| 6,073,590 A | 6/2000 | Polding |
| 6,076,717 A | 6/2000 | Edwards et al. |
| 6,129,096 A | 10/2000 | Johnson |
| 6,199,737 B1 * | 3/2001 | Ringelstetter ................. 224/675 |
| 6,220,435 B1 | 4/2001 | Noile |
| 6,240,881 B1 | 6/2001 | Edwards et al. |
| 6,289,849 B1 | 9/2001 | Macedo et al. |
| 6,688,260 B2 | 2/2004 | Morrison |
| 7,194,982 B2 | 3/2007 | Edwards |
| D553,307 S | 10/2007 | Ko |
| 7,281,495 B2 | 10/2007 | Wagner |
| 7,367,286 B2 | 5/2008 | Beaupre |
| 7,377,709 B2 | 5/2008 | Butler |
| 7,387,088 B2 | 6/2008 | Sporn |
| D573,314 S | 7/2008 | Plewa |
| 7,407,207 B2 | 8/2008 | Yilmaz |
| 7,410,197 B2 | 8/2008 | Edward |
| 7,426,905 B2 | 9/2008 | Honeycutt |
| D578,256 S | 10/2008 | Miller |
| 7,431,360 B1 | 10/2008 | Bielak |
| 7,461,615 B2 | 12/2008 | Albright |
| 7,530,333 B2 | 5/2009 | Sumner et al. |
| 7,536,980 B2 | 5/2009 | Cooper |
| D595,882 S | 7/2009 | Dupps et al. |
| 2008/0042000 A1 * | 2/2008 | Horton ......................... 242/382 |
| 2008/0173257 A1 * | 7/2008 | Steiner et al. ................. 119/796 |
| 2010/0116857 A1 * | 5/2010 | Vickers ......................... 224/191 |

* cited by examiner

*Primary Examiner* — Monica Williams

(57) ABSTRACT

A leash assembly has a housing for a sanitizer container and a compartment for wipes or napkins. The leash assembly ensures that the sanitizer and wipes or napkins are always with the leash or harness and cannot be forgotten or left behind. Furthermore, this makes it convenient to carry fluids or wipes when walking a pet or infant. The invention enhances personal hygiene, and pet hygiene.

2 Claims, 6 Drawing Sheets

LEASH OR HARNESS WITH A BUILT-IN CONTAINER FOR SANITIZER AND OTHER FLUIDS, AND WIPE COMPARTMENT AND METHODS OF USES THEREOF

CROSS-REFERENCE TO RELATED APPLICATION

The subject application is based on Provisional Patent Application No. 61/285,680 filed Dec. 11, 2009, the entire contents of which are incorporated by reference. This utility application is being filed within statutory term for claiming priority based on a provisional application

BACKGROUND OF THE INVENTION

The rapid increase of urban population coupled with the increasing popularity of dogs and other pets has created a serious sanitary problem in connection with the disposal of animal litter, and particular canine litter. Since many animal pet owners have permitted their animals to deposit solid excrement on both private and public property, a numbers of communities have enacted ordinances requiring pet owners, under penalty of fine, to retrieve and dispose of litter created by their pets.

It has been found that the willingness of pet owners to retrieve and properly dispose of animal litter is related to the ease, convenience, economy and hygiene with which the litter may be handled. While a number of devices have been proposed and developed for the purpose of disposing of animal litter, none of them deals with the post-pickup hygiene. Individuals have turned to carrying hand sanitizers or antibacterial wipes in a clothing pocket or handbags for use when needed. Some have recognized the desirability of providing an easy way to carry pet and other supplies when going for a walk utilizing a retractable leash or harness. For example, U.S. Pat. No. 5,447,227 discloses a pet supplies carrying case; not on a leash. This method presupposes, however, that the pet owner will always have access to and remember to grab a sanitizer fluid or wipe prior to walking the pet. Furthermore, the device is cumbersome. Each of these prior devices, however, suffers from other disadvantages which the present invention is intended to overcome.

Accordingly, there is a need for a leash assembly which provides easy access to fluid and wipe sanitizers when needed. There is a further need for a leash assembly which incorporates wipe sanitizers and fluid sanitizers into the leash assembly. The present invention fulfills these and provides other related advantages.

SUMMARY OF THE INVENTION

The present invention relates to a leash or harness assembly with a built-in housing to hold a container or bottle for sanitizer and other fluids. The leash assembly also has a wipe compartment. The bottle attached to the leash assembly will release the fluid when squeezed, or when a dispenser is pushed, pumped or tilted. The wipe holder will release a sheet of wipe when a top sheet is pulled from an opening. Each component will work separately and individually. The sheets may be removed by opening the compartment directly.

The invention can be made by plastic molding the components in one piece, this is the preferred means. However, the invention can be made by molding each component separately and attaching them to the leash or harness by glue, screw or other well established means of fastening.

An individual will squeeze, pump or push a nozzle to dispense a fluid, such as, a sanitizer from the bottle for personal hygiene, hygiene of a pet or infant. The fluid would have been previously placed in the bottle. The fluid could be a powder, liquid, mist or gel. The individual will pullout a layer of wipe from the opening of the wipe compartment. The wipe could be dry or moist, and preferably coated, dampened, or embedded with antibacterial agents or other antimicrobial agent. The wipes would have been previously placed in the compartment. This could be used for personal hygiene, other individual's or a pet's.

This invention can be used in vehicles as a built-in hygiene center or console, for example. This invention ensures that the sanitizer/fluid or wipe is built onto the leash or harness, thus it is always with the leash or harness and cannot be forgotten, misplaced or left behind. Furthermore, this makes it convenient to carry fluids or wipes when walking a pet or infant.

BRIEF DESCRIPTION OF DRAWINGS

The invention will be better understood and objects other than those set forth above will become apparent when consideration is given to the detailed description that follows thereof. Such description makes reference to the annexed drawings wherein.

The same reference numerals refer to the same parts throughout the various figures.

Figure 1:
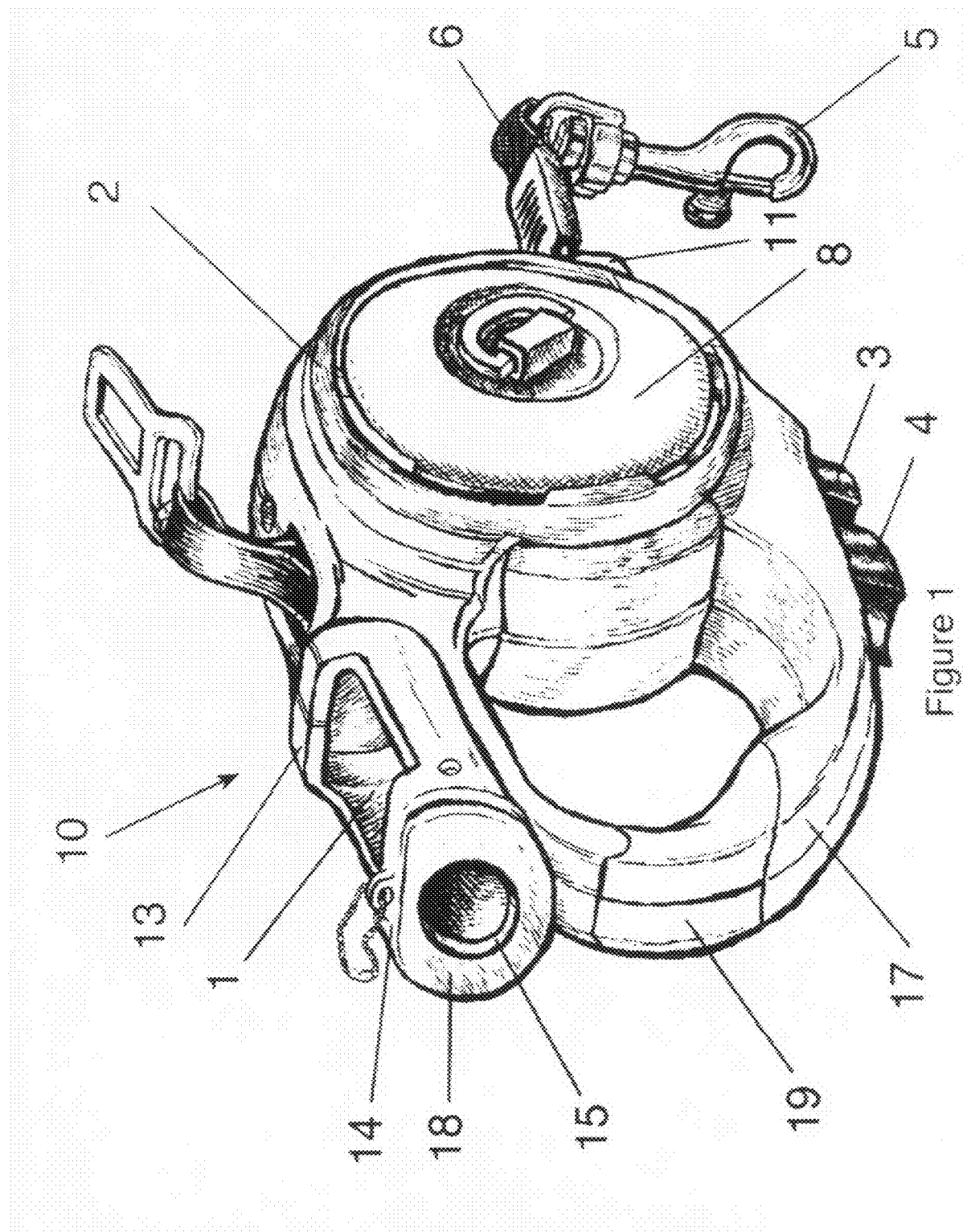
FIG. 1 is a perspective view of an embodiment of the assembly of the present invention showing the sanitizer container housing with the compartment for the wipes in the closed position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF THE PREFERRED EMBODIMENT

With reference now to the drawings, and in particular to FIGS. 1 to 6 thereof, a new and improved novelty leash assembly embodying the principles and concepts of the present invention is generally designated by reference as numeral 10.

In FIG. 1, the leash assembly 10 is shown in a preferred embodiment as having a generally rectangular body 2 having somewhat rounded contours at the ends thereof. However, the body could be substantially circular in another embodiment. Moreover, in other embodiments body 2 may comprise other shapes and configurations without departing from the spirit and scope of the invention. Body 2 is constructed from a rigid and substantially unbreakable material such as a plastic or composite material. In preferred embodiments body 2 may be from 4 to 6 inches high, from 5 to 7 inches long and from 1-3 inches wide.

Leash assembly 10 is preferably designed to be hand-held or attached to a stationary or mobile object. To that end body 2 comprises a handle 17 at one end thereof for grasping, such as by a pet owner walking a pet. Handle 17 may have a hinged section 19 that may be rotated away from the remainder of handle 17, to allow the handle to be placed around an object. Hinged section 19 can then be rotated back to the position shown in FIG. 1 to attach the leash assembly to the object.

At the opposite end, body 2 has an opening 11 with a retractable leash strap 6 extending therefrom. The leash strap 6 may have a leash hook at a distal end thereof to facilitate attachment to a pet collar. The proximal end of the leash strap 6 is attached to a conventional wind up device inside of body 2. The wind up device may be spring loaded, as is known, to facilitate extension and retraction of leash strap 6 from or into the receptacle body 2. The leash assembly 10 may have a lock 4 to lock the leash strap in its extended configuration and a button 3 that operates an unlock mechanism to release the leash strap from an extended and locked configuration to facilitate its being wound up into the body 2. In one preferred embodiment, the lock 4 for the leash strap is a cylinder. The lock for the leash strap may be from ¼ to ½ inches high, and ½ to ¾ inch wide. However in alternative embodiments, the lock for leash strap 4 may have other shapes. The lock for leash strap 4 may be of any unbreakable material. That is, the lock for the leash strap may be of any material that will not break into sharp pieces that could be dangerous when it is pushed by hand to operate to lock the strap for the leash. Such materials may include but not limited to molded plastics, composites, wood, vinyl and the like.

Figure 2:
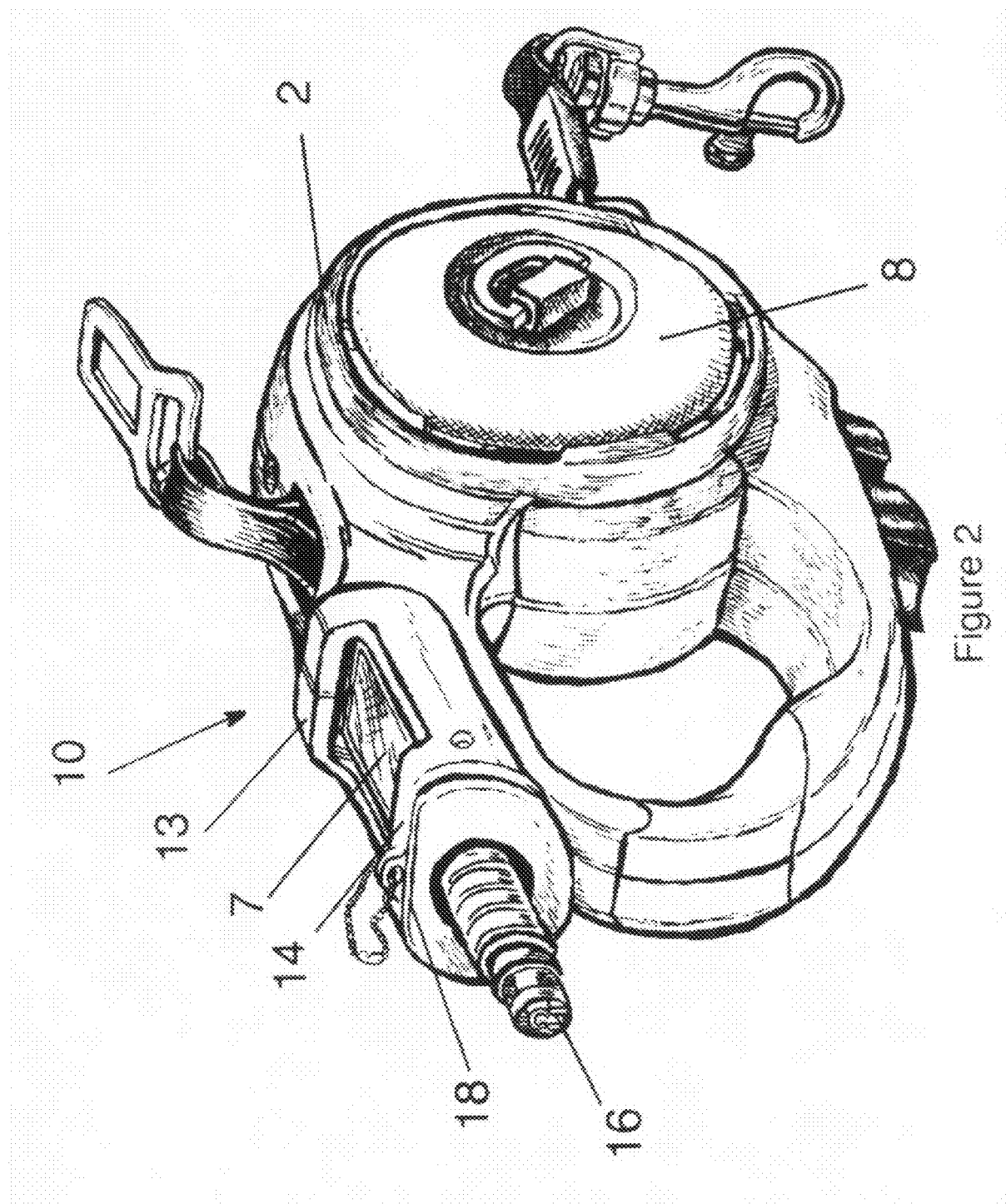
FIG. 2 is a perspective view of the assembly of the present invention showing the installed sanitizer container within the container housing.

In accordance with one aspect of the invention, body 2 also comprises a rigid housing 1 at a top thereof. Housing 1 may be integrally formed with body 2, or may be assembled separately and attached to body 2. Housing 1 is adapted to receive a sanitizer container 7 as shown in FIG. 2. Sanitizer container 7 may take various forms but in a preferred embodiment sanitizer container 7 may be a conventional spray bottle or container. The sanitizer housing has a stop 13 at one end thereof and is open at the other end 14 thereof. A spray bottle can be slid into housing 1 from the open end 14. A nozzle 16 of container 7 protrudes from the open end 14 of housing 1. Nozzle 16 may be a spray nozzle to facilitate spraying of sanitizer from sanitizer container 7 unto a pet owners hands, pets' paws or any other object or surface that it is desired to sanitize. A collar 18 having an opening 15 therein is removably attached to the open end of housing 1. The opening 15 is just larger than the nozzle 16 but smaller than the rest of container 7, so that only the nozzle 16 of container 7 extends through the opening 15 when the collar is attached to the housing. In this way the collar 18 holds the container 7 within housing 1 with the nozzle extending from the housing as shown in FIG. 1. Even when collar 18 is detached from the opening of housing 1, to allow container 7 to be inserted in or removed from the housing, collar 18 may still be linked to housing 1 by a chain, cord or other similar device (not shown) to prevent it from being lost.

Figure 3:
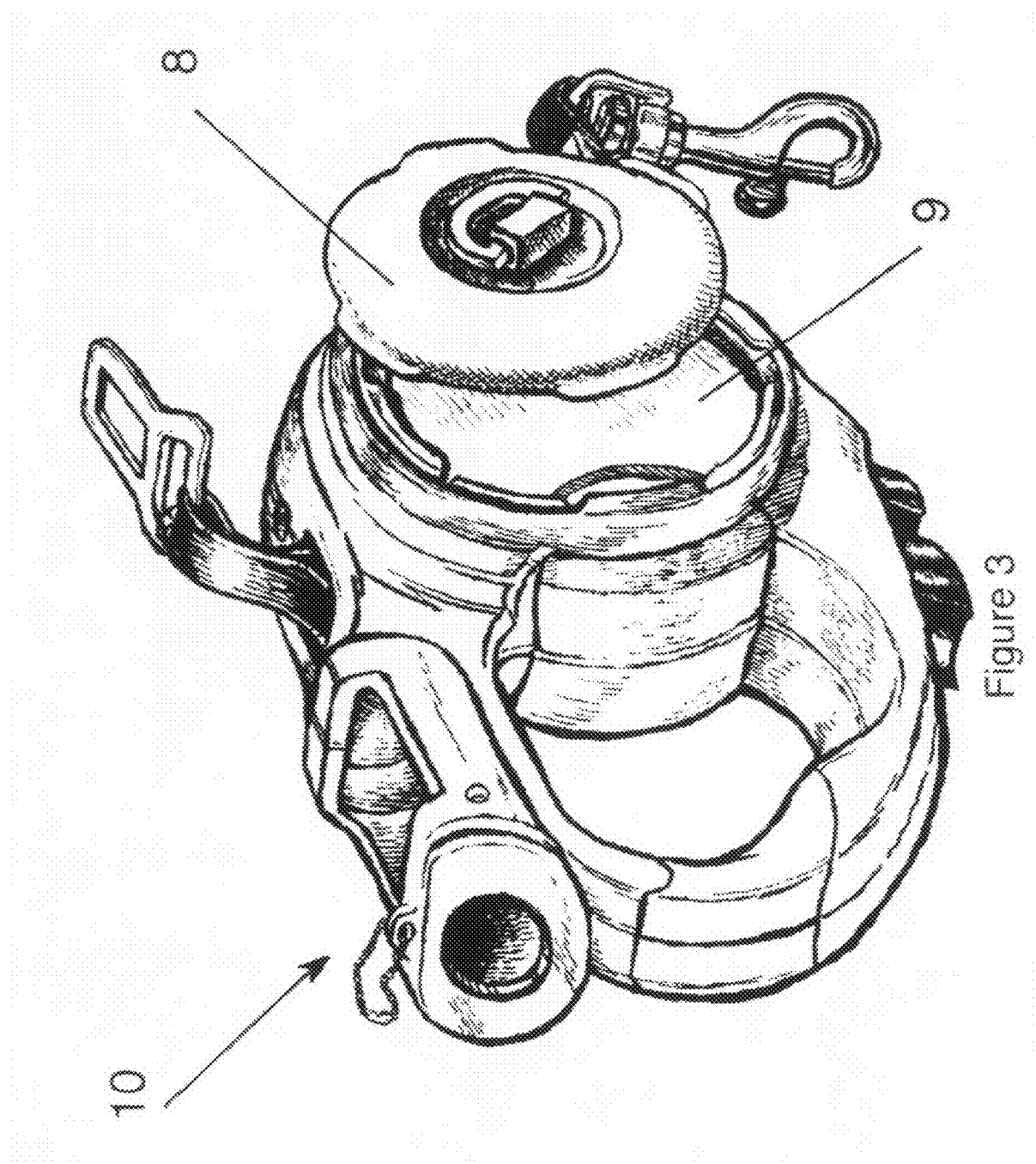
FIG. 3 is another perspective view of the assembly of FIGS. 1 and 2 with the compartment for the wipes in the open position.
Figure 4:
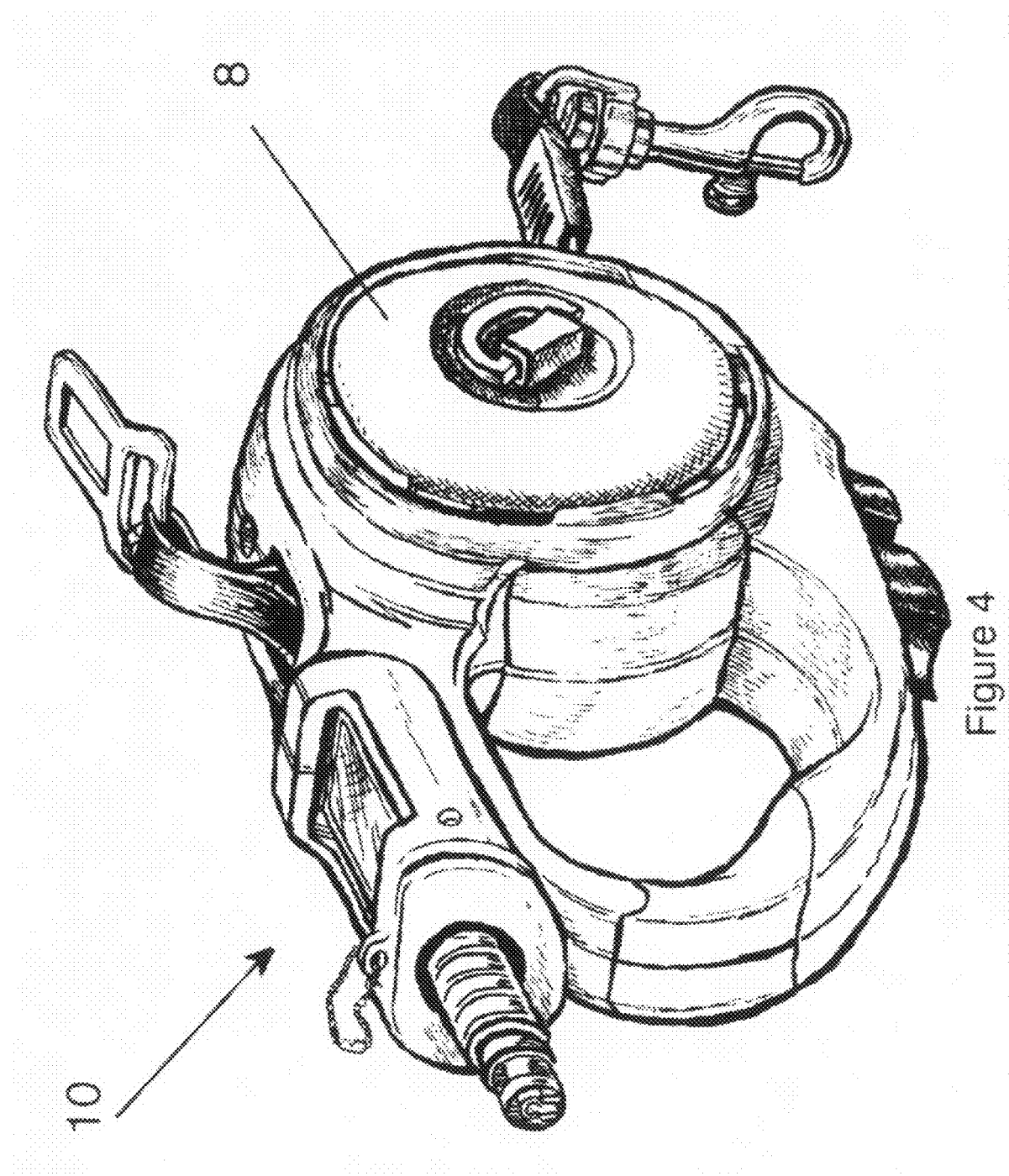
FIG. 4 is a perspective view of an embodiment of the assembly with a round cover.
Figure 5:
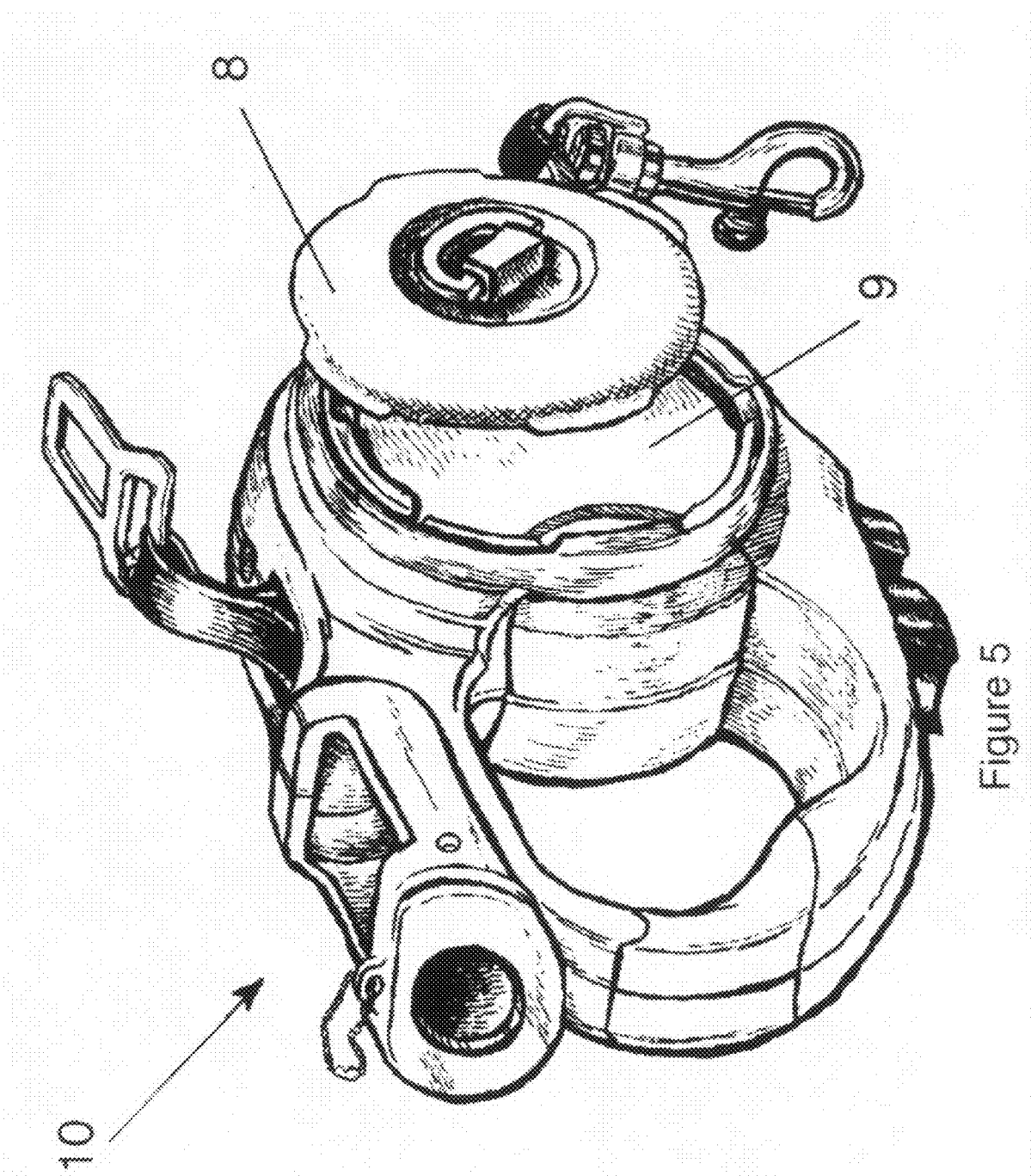
FIG. 5 is a perspective view of an embodiment of the assembly with an alternate cover for the wipes compartment.
Figure 6:
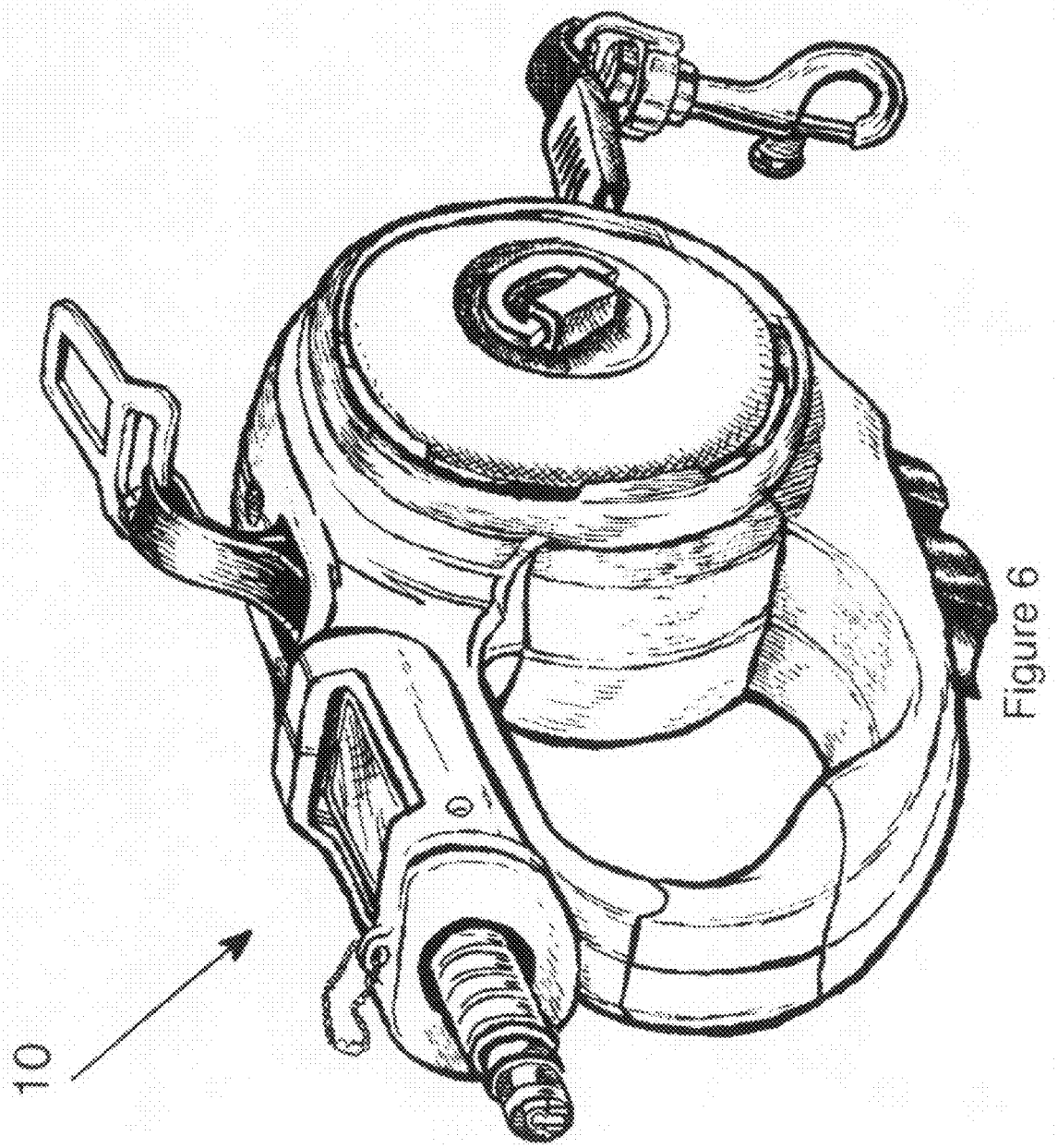
FIG. 6 is a perspective view of the assembly of FIG. 5, with the compartment cover closed.

In accordance with another aspect of the invention, leash assembly 10 incorporates a compartment 9 therein for holding wipes or napkins therein. The wipes or napkins can be used for wiping or cleaning things such as a pet owners hands. The wipes can be wet or dry. The compartment can include a cover 8 to enclose and protect the wipes, as shown in FIG. 1. FIG. 3 shows the cover in its open position, to facilitate placement of the wipes into compartment 9 or removal of wipes from compartment 9. Cover 8 could have various configurations without departing from the spirit and scope of the present invention. Cover 8 can be constructed from the same materials as the rest of body 2. FIG. 4 shows a round door. FIG. 6 shows a door hinged at its top. FIG. 5 shows the door of FIG. 6 in an open position.

Therefore the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention.

What is claimed as being new and desired to be protected by Letters Patent of the United States is as follows:

1. A leash assembly comprising a generally rectangular body having a leash strap at one end thereof, the body having a handle at an opposite end thereof to facilitate gripping the body, the body having a rigid housing on a top portion of the body above the handle, the housing removably containing a sanitizer container, the sanitizer container comprising a bottle having sanitizer solution therein, the bottle having a nozzle, the body further having a compartment with an openable cover, the compartment containing wipes or napkins therein; the housing having a stop at one end thereof and an opening at an opposite end to allow said sanitizer container to be placed in the housing and removed from the housing, a collar removably encircling the housing at the opening thereof, the collar having a collar opening such that when the collar is attached to the opening of the housing the collar holds the bottle within the housing with the nozzle extending from the housing through the collar opening, the leash strap further having means at a distal end thereof to facilitate attachment to a pet collar, the leash strap is retractable into said body and extendable therefrom by means of a spring loaded wind up device, said handle having a hinged section to facilitate placement of the handle about an object.

2. The leash assembly of claim 1 said bottle further comprising a spray bottle.

\* \* \* \* \*